United States Patent [19]
Hsiao

[11] Patent Number: 5,971,272
[45] Date of Patent: Oct. 26, 1999

[54] SECURED PERSONAL IDENTIFICATION NUMBER

[75] Inventor: Alaric S. Hsiao, Manalapan, N.J.

[73] Assignee: AT&T Corp., New York, N.Y.

[21] Appl. No.: 08/914,135

[22] Filed: Aug. 19, 1997

[51] Int. Cl.[6] .............................. G06K 5/00; G06F 17/60
[52] U.S. Cl. ..................... 235/380; 235/382; 235/379; 455/411; 380/23
[58] Field of Search .................... 235/395, 379, 235/380, 382; 455/406, 410, 411; 380/23, 24

[56] References Cited

U.S. PATENT DOCUMENTS

| | | | |
|---|---|---|---|
| 4,123,747 | 10/1978 | Lancto et al. | 340/149 |
| 4,317,957 | 3/1982 | Sendrow | 178/22.08 |
| 4,629,872 | 12/1986 | Hällberg | 235/380 |
| 4,630,201 | 12/1986 | White | 235/379 |
| 4,797,920 | 1/1989 | Stein | 380/24 |
| 4,899,373 | 2/1990 | Lee et al. | 379/207 |
| 4,965,568 | 10/1990 | Atalla et al. | 235/379 |
| 5,163,097 | 11/1992 | Pegg | 380/23 |
| 5,228,084 | 7/1993 | Johnson et al. | 380/23 |
| 5,246,375 | 9/1993 | Goede | 434/236 |
| 5,367,572 | 11/1994 | Weiss | 380/23 |
| 5,371,797 | 12/1994 | Bocinsky, Jr. | 380/24 |
| 5,414,698 | 5/1995 | Adams | 370/17 |
| 5,448,638 | 9/1995 | Johnson et al. | 380/23 |
| 5,451,757 | 9/1995 | Heath, Jr. | 235/382 |
| 5,455,857 | 10/1995 | McGuire | 379/355 |
| 5,475,756 | 12/1995 | Merritt | 380/24 |
| 5,478,994 | 12/1995 | Rahman et al. | 235/380 |
| 5,509,224 | 4/1996 | Roy | 40/586 |
| 5,561,704 | 10/1996 | Salimando | 379/58 |
| 5,561,706 | 10/1996 | Fenner | 379/60 |
| 5,627,355 | 5/1997 | Rahman et al. | 235/380 |
| 5,642,401 | 6/1997 | Yahagi | 455/411 |
| 5,754,652 | 5/1998 | Wilfong | 380/24 |
| 5,828,956 | 10/1998 | Shirai | 455/411 |

*Primary Examiner*—Thien M. Le
*Assistant Examiner*—Daniel St. Cyr

[57] ABSTRACT

A technique for secured personal identification numbers which cannot be readily detected by either observation or repeated trial attempts is disclosed. The secured personal identification number maintains the dual level security of a personal identification number or password without adding substantial complexity or an undesirable reduction in security. Moreover, the secured personal identification number of the present invention is readily applicable to any type of account which is accessed by entry of an account number and a personal identification number or password.

21 Claims, 3 Drawing Sheets

SECURED PERSONAL IDENTIFICATION NUMBER

FIELD OF THE INVENTION

The invention relates generally to account access authorization. More particularly, the invention relates to a secured personal identification number ("PIN") for authentication of the identity of an individual seeking access to an account.

BACKGROUND OF THE INVENTION

The personal account has become an omnipresent aspect of contemporary society, associated with almost every aspect of our lives. Personal accounts are associated with, for example, telephone calling cards, checking and savings accounts in banks, computer networks, and credit cards. Typically, account security is maintained (and unauthorized access prevented) by use of a password or personal identification number (PIN).

Account security is maintained by requiring two separate steps for account access. First, the account number must be entered. Second, a password or PIN associated with the account must be entered as well. The account number is typically not concealed (i.e., it may be printed on the telephone calling card or credit card, or it may be recorded on a magnetic strip affixed to the card which is read by an associated card reader) and may be considered, at least for security purposes, to be readily accessible. In contrast, a password or PIN is not supposed to be readily accessible. Rather, a user is typically instructed to memorize and not write down a password or personal identification number to prevent inadvertent disclosure of the password or PIN. By keeping the password or PIN confidential, unauthorized access to an account is hopefully prevented.

For example, a telephone calling card number may be provided by keying in the number on a telephone keypad or, in some circumstances, sliding the telephone calling card through a magnetic card reader attached to a specially equipped telephone. The account number is printed on the telephone calling card, and accordingly is readily accessible to any individual looking at the telephone calling card. However, merely knowing the account number does not allow someone to use the telephone calling card since a caller also has to know the PIN associated with the telephone calling card before a call may be placed using the telephone calling card. In theory, someone who steals the telephone calling card or merely knows the account number printed on the telephone calling card cannot make fraudulent telephone calls using the telephone calling card account because only the authorized user knows the PIN necessary to activate the account.

Similarly, an automatic teller machine (ATM) access card has at least one account number associated with it which is normally recorded on a magnetic strip affixed to the card that is read when the card is inserted into the automatic teller machine. Again, unauthorized use of the card (and therefore unauthorized account access) is theoretically prevented by requiring entry of a personal identification number before an account identified on the card can be accessed to, for example, withdraw money from the account. The owner of the ATM access card is normally instructed to memorize the PIN and not write it down to prevent an unauthorized user from learning the PIN.

With respect to telephone calling cards and ATM access cards, a user will typically recall the PIN associated with the account and enter the PIN by pressing numeric buttons on a keypad At that instant, the secrecy of the PIN, which was stored only in the user's memory and therefore undetectable, evaporates. Any individual who can see the user entering the PIN can note the PIN as it is punched into the keypad and thereafter knows the PIN for the account.

Personal identification numbers are also used to limit cellular telephone fraud. Normally, each cellular telephone has a unique identifier which is transmitted along with the telephone call to identify the cellular telephone for billing purposes. Unfortunately, the unique identifier may be detected by a thief equipped with a scanner. The thief can then program another cellular telephone with the previously unique identifier and calls made using the "cloned" telephone will be billed to the cellular telephone from which the unique identifier was stolen. The providers of cellular telephone services have sought to reduce the amount of fraud perpetrated in this manner by requiring entry of an authorization code before the cellular telephone can be used. By so doing, the providers of cellular telephone services have established an additional level of security that limits fraudulent use of the telephone. Unfortunately, the personal identification number can also be detected by a scanner and this security technique may be defeated as well.

Computer networks also have user accounts and associated passwords. For example, a user may have an electronic mail account or, as is increasingly often the case, the user may have a personal account associated with a home page of the World Wide Web accessed through the Internet. Typically, the user's account number may be readily obtained but unauthorized access to the user's account is restricted by requiring entry of a password or personal identification number before access to the account is granted. For example, a computer user may have a stock trading account with a stock broker that maintains a web page. The user's account is not accessible without entry of an identification number, which is normally keyed in by the user at a remote terminal. As with other multiple level security systems using passwords or personal identification numbers, the identification number may be detected by an observer. In this case, the observer may be simply watching the keyboard or, alternatively, the observer may be using a so-called "sniffer" to observe the network traffic.

Another area where computer networks rely upon passwords for security is general network access. For example, many networks maintain a file for each user in which the user's various network account numbers (i.e., log in names) and associated passwords are maintained in a plain text file (e.g., r.host). This allows a user who has logged in to the network from her primary terminal to access various associated networks without having to repeatedly enter her user name and password for each access to an associated network. Although this system greatly enhances the ease with which a user can traverse network elements, it provides an opportunity for abuse if a computer hacker obtains access to the file information. At that point, the computer hacker can, at a minimum, view files to which he is not authorized for access. In worst case scenarios, the unauthorized user may destroy files or, under the guise of being an authorized user, otherwise damage the system or the authorized user's reputation.

In yet another application, a personal identification number or password is used in connection with voice mail. In a typical voice mail system, a user will enter the voice mail account number, typically the user's extension number, and then will be prompted to enter an access code of some kind. It is only by entering the appropriate access code (a PIN or password) that the user is able to listen to his or her voice mail. Thus, the user is able to maintain a degree of confidentiality with respect to her voice mail.

Each of these applications suffers from a common flaw. A casual observer or a dedicated intruder can detect the supposedly secret personal identification number or password, either by direct observation or by repeated trial attempts. Having determined what the personal identification number or password is, an unauthorized person can obtain access to the account with relative ease, having bypassed one of the security mechanisms intended to prevent such abuse.

For example, a telephone calling card can be readily abused by a thief observing an authorized user enter the calling card number and the personal identification number and recording the numbers as they are entered on the telephone keypad. The thief can then place hundreds if not thousands of dollars worth of unauthorized telephone calls.

Alternatively, a thief can watch a bank customer enter her personal identification number in an automatic teller machine and then steal the automatic teller machine access card from the bank customer. Because the thief knows the personal identification number, the thief can easily access all of the customer's bank accounts and the security provided by the personal identification number is easily defeated.

With respect to computer network systems, an intruder may be able to access an account number without direct observation of password entry but simply by repeated trial attempts. The hacker can program a terminal to enter an authorized account number and then determine the password by repeatedly entering guesses at the correct password until the account is accessed. At that point, the network security has been breached and the unauthorized user's access to the network is limited only by the access rights associated with the account. If, as is often the case, the intruder attempts to access the network system administrator's account, the potential for malfeasance is virtually unlimited.

A similar circumstance exists with respect to voice mail systems. In that situation, an interloper may, with an appropriately configured computer modem, repeatedly enter access codes to obtain unauthorized access to a specific voice mail account without manually entering the access codes on a telephone keypad. A determined interloper will eventually enter the correct access code and be able to listen to messages and, depending on the voice mail system, in some cases, use the voice mail account to place long distance calls and otherwise abuse the system.

Accordingly, passwords and personal identification numbers do not provide adequate security against unauthorized account access because of their vulnerability to observation and/or discovery by repeated trial attempts.

SUMMARY OF THE INVENTION

In view of the foregoing, there is a need for a security mechanism which can prevent unauthorized account access without being vulnerable to detection by either observation or repeated trial attempts. In particular, there is a need for a secure technique for account access with personal identification numbers that are not susceptible to detection by observation or repeated trial attempts.

The present invention is advantageously applicable to any account access system where account access may be predicated upon the provision of a password or personal identification number. The present invention provides a flexible technique for provision of a secured personal identification number (SPIN) that is not vulnerable to detection by either observation or repeated trial attempts. The secured personal identification number of the present invention thus advantageously maintains the multiple level security of a personal identification number or password without adding substantial complexity. Moreover, the secured personal identification number of the present invention may be used for, inter alia, automatic teller machines, telephone calling cards, cellular telephones, Internet file access, or computer networks.

Instead of associating a single personal identification number with an account for access, the present invention associates three different personal identification numbers with each account: a master personal identification number (MPIN); a random personal identification number (RPIN); and a secured personal identification number (SPIN). Although three different personal identification numbers are associated with each account access, only one of the personal identification numbers, the MPIN, is permanently associated with the account (and hence has to be memorized by a user). The RPIN and SPIN are dynamic and change with successive account access attempts and therefore are not memorized.

The master personal identification number (MPIN) is directly associated with the account in the customer account access system (CAAS) and is kept secret to prevent detection. Unlike a conventional personal identification number, an MPIN does not have to be entered or transmitted for account access. Because this master personal identification number is stored in the computer account access system memory, (or in a database securely accessed by the customer account access system), and, unlike a typical personal identification number, is never exposed at any time and may be stored in an encrypted format, the likelihood of unauthorized disclosure of the MPIN is minimized.

The random personal identification number (RPIN) is generated each time an attempt is made to access the account. Unlike a conventional personal identification number, the value of the RPIN is dynamic and may be different for each attempt to access an account. Because the value of the RPIN is essentially (and ideally) random and dynamically changes with each access request, security of an account associated with a particular RPIN is not compromised by discovery of the RPIN used for a single account access.

The secured personal identification number (SPIN) is provided by a user with knowledge of both the MPIN and RPIN and, if access is authorized by the SPIN validator, permits access to the account. The SPIN validator, a CAAS component, determines whether a particular SPIN is valid or not based on the SPIN translator. The SPIN translator applies the RPIN to the MPIN and derives the SPIN therefrom. The complexity of the SPIN translator is variable and dependent upon the circumstances of the particular account and customer account access system. Thus, the SPIN translator may be extremely complex in those circumstances where the SPIN is derived from the RPIN and the MPIN using a microprocessor or microcontroller. On the other hand, if the SPIN is intended to be derived from the RPIN and the SPIN by a user at a telephone in a public facility such as an airport, the SPIN translator would likely be much less complex and not require substantial computational ability.

The present invention is not vulnerable to detection by observation because the actual personal identification number associated with an account is never entered or transmitted. Instead, a secured personal identification number, valid for a single account access in conjunction with a particular random personal identification number (RPIN), is entered and/or transmitted for access through the account access system. In fact, the CAAS may be designed to guarantee the SPIN for one account access is always different from the SPIN used for the previous account access. A master personal identification number (MPIN) which is associated with the account is not entered or transmitted and hence cannot be detected by observation.

The present invention is not vulnerable to detection by repeated trial attempts because the secured personal identification number (SPIN) for one account access is not necessarily the same as the secured personal identification number (SPIN) for a subsequent account access. A new random personal identification number (RPIN) may be generated each time an attempt to access the account is made. Accordingly, the SPIN associated with an account would not be detected by repeated trial and error attempts until the correct personal identification number is ultimately stumbled upon.

The present invention is advantageously flexible in that it may be implemented as an optional security method which can be bypassed by a user under the appropriate circumstances. For example, a telephone calling card holder may feel that the additional security of the SPIN is not needed when making a telephone call from the privacy of his hotel room while recognizing the advantage of the SPIN with respect to preventing telephone fraud when placing calls from a public pay telephone. Accordingly, the customer account access system (CAAS) for the telephone calling card would provide a caller with the option of entering the MPIN instead of the SPIN under appropriate circumstances.

Alternatively, the CAAS could present the caller with a choice of different SPIN translators (including no SPIN translator at all) to accommodate varying degrees of mental acuity or personal predilections. Advantageously, variable SPIN translators would provide additional security as an observer may not know the RPIN, MPIN or SPIN translator and would thus be unable to discern the MPIN. Additional security might be achieved by using a plurality of SPINs for each account access or by evaluating each RPIN for prior use to limit or avoid repetition.

Additional features and advantages of the present invention will be understood from the following description of various embodiments, which description should be taken in conjunction with the accompanying drawing.

DETAILED DESCRIPTION

Figure 1A:
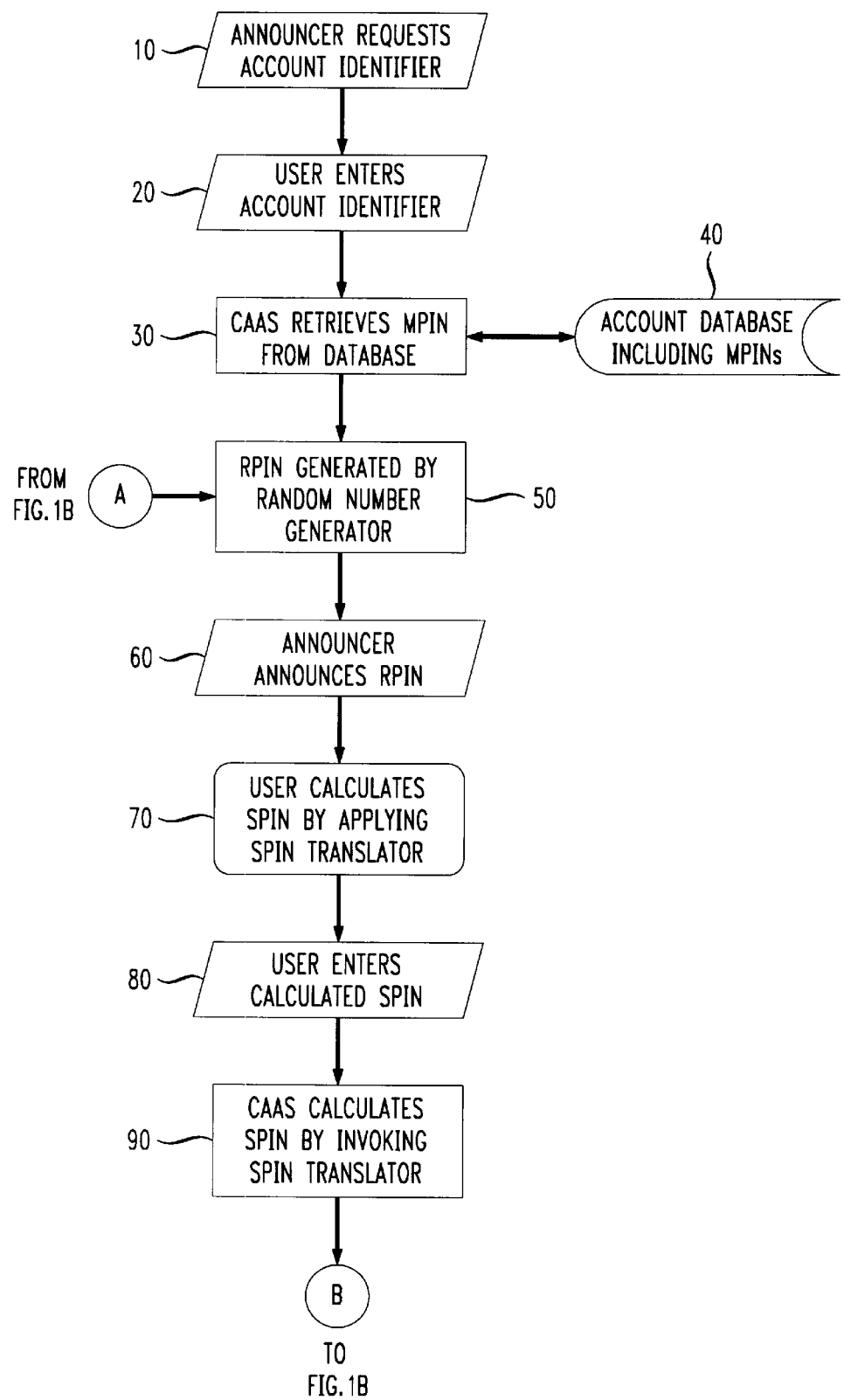
FIG. 1a is a first flow chart diagram of an embodiment of the present invention.
Figure 1B:
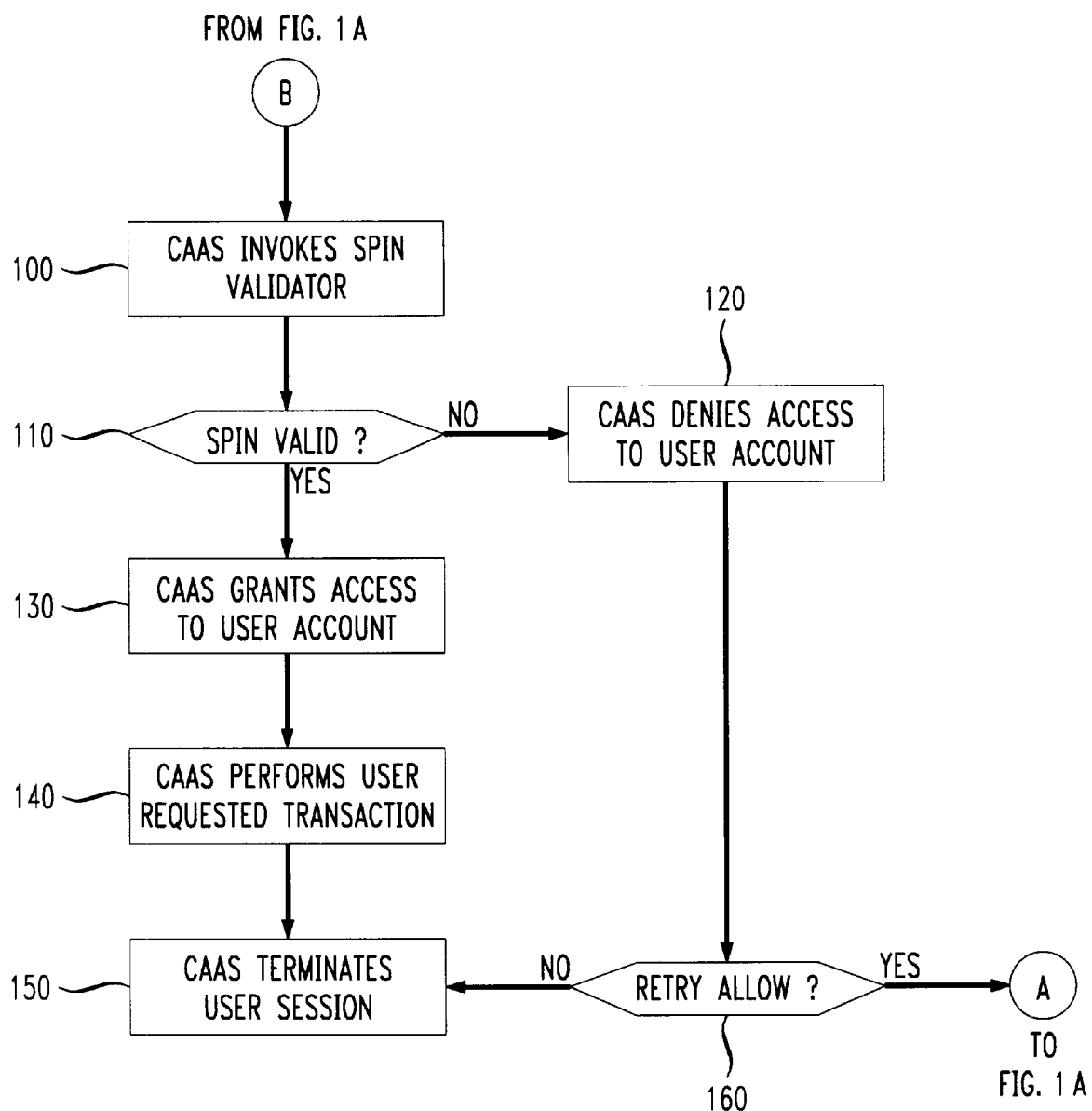
FIG. 1b is a second flow chart diagram of an embodiment of the present invention.

A novel system for providing secure access to customer accounts is described herein. Referring to FIGS. 1a and 1b, a secured personal identification number may be used to obtain access to a service provider account through a customer account access system (CAAS) as illustrated.

A customer account access system is a system through which a customer accesses an account maintained by the service provider. This account may be, inter alia, a credit card account, a telephone calling card account, a bank account, or an Internet Service Provider user account. Typical customer account access systems include automatic teller machines and twenty-four hour bank account telephone inquiry systems. Another example of a CAAS is the telephone calling card service provided by telephone service providers wherein the caller's account number is transmitted to the CAAS across the network and the caller is then verbally prompted to enter a personal identification number (PIN) using the telephone keypad. When a caller enters a correct PIN, the call is billed to the customer's calling card account. Accordingly, a CAAS should be able to retrieve customer accounts and information related to each retrieved account, specifically the account designation and personal identification numbers or passwords associated with the account.

A customer account access system, in addition to being able to interface with the customer accounts, has to be able to interface with the customer. Accordingly, the customer account access system should include an announcer to convey information and requests for information to the user. In an automatic teller machine type of customer account access system, the functions of the announcer are typically performed by a video display, either a cathode ray terminal or a simple alphanumeric character display. In a telephone calling card environment, on the other hand, the announcer may be an audio playback device that generates speech heard by the caller.

Alternatively, some telephones incorporate alphanumeric displays and the announcer may be a combination of audio and video output devices. In general, the announcer may be any device or system that communicates with a user, although it is desirable (albeit not necessary) to control the communication such that only the user is able to read, hear or otherwise understand the communications from the announcer. It is important to note that the user is not necessarily a human customer. Although the user is a human customer with respect to an ATM or telephone calling card, the user is a cellular telephone device with respect to use of the present invention in cellular telephones and the user is a computer initiating a connection request in the context of a computer network.

Referring to FIG. 1a, when a user initiates account access through the customer account access system, the announcer requests an account identifier as shown by input/output block 10. A user may initiate an account access by, for example, dialing the telephone number associated with a telephone calling card service. As noted above, the request to enter an account identifier may be oral as in the telephone calling card or it may be conveyed visually as in an automatic teller machine. Where the customer account access system is implemented in a computer network or cellular telephone system, the request for an account identifier would be conveyed digitally or in an alternative electronic form.

Referring again to FIG. 1a, the user responds to the request by providing an appropriate account identifier as shown by input/output block 20. In a telephone calling card related embodiment, the user could enter the telephone calling card account number using the telephone keypad. In an automatic teller machine related embodiment, the account identifier may be recorded on a magnetic strip affixed to the card which is read by a card reader associated with the automatic teller machine when the account access is initiated. In a computer network related embodiment, the account identifier could be, for example, the login name associated with the user's network account.

Referring to processing block 30 of FIG. 1a, the customer account access system retrieves the master personal identification system associated with the identified account from the account database 40. The account database stores customer accounts including information relating to the account such as the MPIN. In an embodiment of the present invention, the stored MPIN may be encrypted to ensure the confidentiality of the MPIN. In the embodiment of the present invention where the MPIN is encrypted, the CAAS would have to decrypt the MPIN during the SPIN translation, in which case a decryptor could be incorporated into the SPIN translator.

Referring to processing block 50 of FIG. 1a, a random personal identification number (RPIN) is generated in the customer account access system. In an embodiment of the present invention where the personal identification number is entirely numeric, the RPIN is generated by a random number generator. In an alternative embodiment of the present invention where the RPIN is alphanumeric, the RPIN generator would accordingly generate random alphabetic characters as well as numbers. However, where the characters are expressed in a binary or digital code such as ASCII, an appropriately configured random number generator would generate random alphanumeric characters. In an alternative embodiment of the present invention, the RPIN may be generated simultaneously with or even before the MPIN is retrieved as the MPIN is not used by the customer account access system until the SPIN translator is invoked. However, verifying that a user has entered a valid account identifier as a preliminary condition to the account access process provides additional security and avoids wasting resources which might otherwise be expended generating an RPIN for a non-existent account.

In an embodiment of the present invention, additional account security checks may be incorporated into account identification validation. For example, the CAAS may monitor account accesses (or access attempts) for suspicious activities. When an access attempt is made after the CAAS has identified or been notified of suspicious activity, the CAAS may suspend the session during account identification validation and instruct the user to contact customer services.

As shown by input/output block 60 of FIG. 1a, once the RPIN has been generated the Announcer announces the RPIN to the user. As noted above, it is generally desirable to communicate the RPIN in a secure fashion which prevents (or at least limits the possibility of) detection of the RPIN by an observer. In an embodiment of the present invention, the RPIN is announced in the same way as the requests for user input are announced. Alternatively, for additional security, such as might be desirable in a highly secure network environment or over the Internet, the RPIN could be encrypted for transmission from the customer account access system to the user.

Referring to block 70 of FIG. 1a, the user receives the RPIN and then, by application of the SPIN translator to the MPIN and the RPIN, calculates the SPIN. The SPIN translator may be expressed by the MRS equation: $\phi(M,R)=S$; where $\phi$ denotes the SPIN translator function, M denotes the MPIN, R denotes the RPIN, and S denotes the SPIN. In an embodiment of the present invention, the SPIN translator function is a mathematical operation. The particular mathematical operation selected for the SPIN translator is dictated by the particular circumstances of the customer account access system with which the SPIN translator function will be used and the mathematical sophistication of the user. Nevertheless, there are certain criteria which are relevant to selection of the SPIN translator.

As noted above, the complexity of the SPIN translator should be tailored to the intended application. For applications in which the SPIN translation will be performed mentally by an individual who has preferably memorized the MPIN and is applying the SPIN translator to the MPIN and RPIN, the SPIN translator should be easy to apply. Depending upon the particular application, it may be desirable to implement the SPIN translator digitally, i.e., applied to each successive digit of the MPIN and the RPIN individually rather than to the MPIN (or RPIN) as a single value.

For example, the SPIN translator could be a simple maximum or minimum function in which each SPIN digit would be the maximum (or minimum) of the corresponding MPIN and RPIN digits. Therefore, if the SPIN translator function was defined as the maximum of each digit of the RPIN and the MPIN, e.g., $MAX_n$, and the personal identification numbers were four digits long, the resulting SPIN digits would be:

$$\{\max(MPIN_1, RPIN_1), \max(MPIN_2, RPIN_2), \max(MPIN_3, RPIN_3), \max(MPIN_4, RPIN_4)\} \quad (1)$$

Accordingly, if the memorized MPIN was 1248 and the RPIN was 3333, then for $\phi(M,R)=MAX_n(M,R)$; $\phi(1248, 3333)=3348$. However, for applications where the SPIN translator was not performed mentally by the user but was instead performed using a computational device such as a microprocessor, the SPIN translator function could be extremely complex.

Irrespective of the complexity of the SPIN translator and its particular application, the selection of a SPIN translator function should also take into account the uniqueness of the SPIN translator.

The uniqueness of a SPIN translator is defined in terms of the uniqueness of the RPIN and the SPIN which are themselves defined in terms of their respective substitution factors. The substitution factor of an RPIN is defined as the number of possible values an RPIN may have to satisfy the MRS equation given specific MPIN and SPIN values. Thus, if only one possible RPIN value will satisfy a particular MRS equation for a given pair of MPIN and SPIN values, the RPIN substitution factor is 1 and the associated SPIN translator would be characterized as RPIN-unique.

Similarly, the substitution factor of an SPIN is defined as the number of possible values SPIN may have to satisfy the MRS equation given a specific pair of MPIN and RPIN values. Accordingly, if only one possible SPIN value satisfies a particular MRS equation for a given pair of MPIN and RPIN values, the SPIN substitution factor is 1 and the associated SPIN translator would be characterized as SPIN-unique.

A particular SPIN translator is completely unique if it is both RPIN-unique and SPIN-unique. In general, a completely unique SPIN translator will provide more security than an SPIN translator which is not completely unique. This is because a SPIN translator which is not SPIN-unique is more susceptible to allowing access when subjected to repeated trial attempts as the entered SPIN does not have to exactly match the derived SPIN, as there may be several SPIN values, each of them will satisfy the MRS equation. Accordingly, each guess will have a higher relative probability of accessing the account. Similarly, but to a lesser degree, a SPIN translator which is not RPIN-unique will be more susceptible to allowing access because multiple trial attempts could be conducted with a single SPIN value that corresponded to more than one RPIN value. It should be noted that a low SPIN substitution factor (and hence SPIN-uniqueness) is relatively more important than a low RPIN substitution factor (and hence RPIN-uniqueness).

One example of a completely unique SPIN translator function is the positive modulo based r operator, a binary operator defined as follows:

$$pmod_r(X, Y) = \begin{cases} (Y - X) \bmod r & \text{if } X \leq Y \\ ((Y - X) \bmod r) + r & \text{if } X > Y \end{cases} \quad (2)$$

The corresponding SPIN translator MRS equation is:

$$\varphi(X, Y) = \varphi(x_1 x_2 \cdots x_n, y_1 y_2 \cdots y_n) = \sum_{i=1}^{n} pmod_{10}(x_i, y_i) \cdot 10^{n-i} \quad (3)$$

where n is the number of digits in X and Y. It should be noted that SPIN validation is not necessarily an "=" operation, particularly where the SPIN translator is not SPIN-unique. In that situation, SPIN validation is more precisely defined by "∈" (i.e., is a member of the set). The positive modulo based r operator provides complete uniqueness without being excessively complex and thus provides an example of an optimal SPIN translator for applications where an individual would be mentally computing the SPIN.

Referring again to FIG. 1a, once the user has calculated the SPIN, the user enters the calculated SPIN into the CAAS as shown by input/output block 80. In the embodiments of the present invention related to an automatic teller machine or telephone calling card, the user would simply enter the SPIN into the ATM or telephone keypad.

Referring to processing block 90 of FIG. 1a, once the user has entered a value for the SPIN the CAAS would invoke the SPIN translator and replicate the user's calculations. The CAAS would not have to wait for the user to enter a SPIN before calculating the SPIN and could invoke the SPIN translator anytime after the RPIN had been generated.

Referring to FIG. 1b and processing block 100 thereof, once the CAAS has received a SPIN entered by the user and invoked the SPIN translator to compute the SPIN, the CAAS would invoke the SPIN validator and compare the entered SPIN and the SPIN(s) computed by the SPIN translator in the CAAS as shown by decision block 110. If the entered SPIN is not found within the set of CAAS computed SPINs, then access to the user account is denied as shown by processing block 120. If the entered SPIN is found within the set of CAAS computed SPINs, then the CAAS grants access to the user account as shown by processing block 130.

If access to the account has been granted, then the CAAS performs account transactions requested by the user as shown by processing block 140. In an embodiment of the present invention related to an automatic teller machine, the requested transactions would presumably relate to withdrawing or depositing money in various bank accounts or possibly to transferring money between accounts. In an embodiment of the present invention related to a telephone calling card, the requested transaction would likely be placement of a long distance telephone call. The particular transactions would vary with the specific application. Once the user has completed the requested transactions, the customer account access system terminates the user session as shown by processing block 150.

Figure 2:
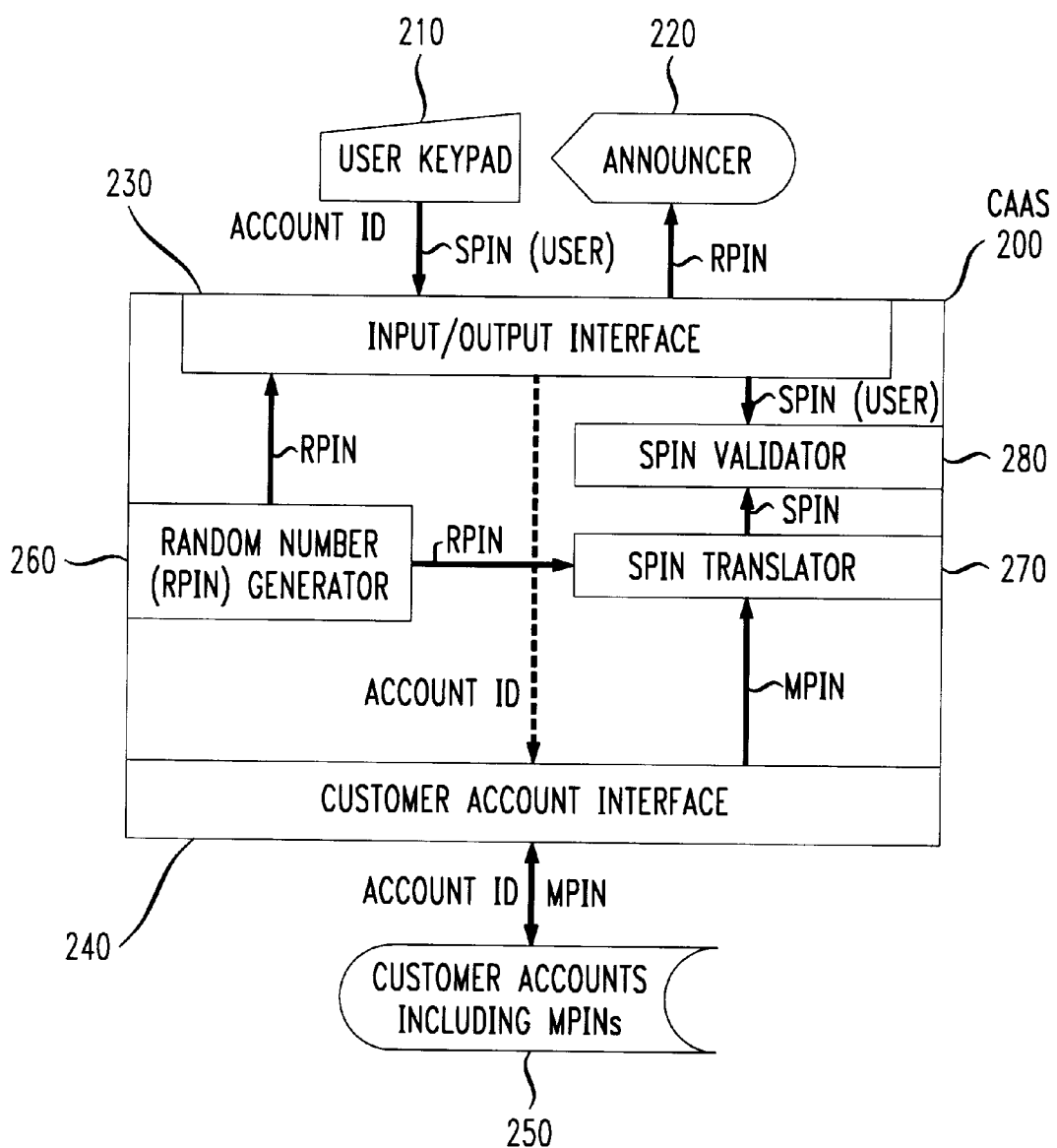
FIG. 2 is a diagrammatic representation of a Customer Account Access System in accordance with an embodiment of the present invention.

If access to the account has been denied, then the user session may be terminated as shown by processing block 150 if retries are not permitted in the particular customer account access system as shown by decision block 160. If, on the other hand, retries are permitted by the CAAS, then a new RPIN is generated as shown by processing block 50 and the SPIN generation and validation processes are repeated. In an alternative embodiment of the present invention, the RPIN is not recalculated for each permitted SPIN attempt. Although this reduces the security of the system, it allows a user to make a mistake without requiring the user to mentally perform the SPIN translation with a new RPIN for each subsequent attempt. In another alternative embodiment of the present invention, the CAAS may allow a finite number of retries before a new RPIN is generated. In another embodiment of the present invention, the random number generator is reseeded based on the current time each time a user initiates a request for user access, thereby ensuring variations in random number generating sequences for each access request session Referring now to FIG. 2, a structural representation of an embodiment of the present invention is shown. In the embodiment of the present invention illustrated, a user communicates with the CAAS 200 through a user keypad 210 and announcer 220. The user enters the account access information through user keypad 210 and receives prompts and notification of the RPIN through the announcer 220, both of which interface with the customer account access system through the input/output interface 230. When, for example, a user enters a customer account identifier through the user keypad 210, the customer account identifier is received by input/output interface 230 and conveyed to customer account interface 240 which in turn transmits the customer account identifier to a database of customer accounts 250. The database of customer accounts 250 returns the MPIN associated with the identified account and the customer account interface 240 relays the MPIN to the SPIN translator 270.

The SPIN translator 270 also receives an RPIN generated by random number generator 260. The RPIN is also conveyed to the user through announcer 220 via input/output interface 230. The SPIN translator 270 applies the SPIN translator function to the received MPIN and RPIN and transmits the computed SPIN to the SPIN validator 280. The user, having received the RPIN through announcer 220, mentally calculates the user SPIN and enters the user SPIN through user keypad 210. The user SPIN is transmitted through input/output interface 230 to SPIN validator 280 and is compared with computed SPIN received from SPIN translator 270. The user is granted access to the identified customer account if the user SPIN is validated.

In several conceivable consumer environments, a flexible customer account access system may be desirable. Accordingly, in an alternative embodiment of the present invention, invocation of the SPIN validator is optional and may be deselected by a user. Thus, for example, if the customer account were a telephone calling card account and the customer account access system were the telephone calling card service, the customer could be prompted by the announcer to select secured personal identification number access or unsecured personal identification number access. If the user selects unsecured personal identification number access, then the customer account access system would not generate an RPIN or invoke the SPIN validator and would instead merely verify that the user entered a personal identification number corresponding to the MPIN (or, alternatively, to another PIN associated with the customer account which was not used in conjunction with the SPIN).

Although various embodiments are specifically illustrated and described herein, it will be appreciated that modifications and variations of the present invention are covered by the above teachings and within the purview of the appended claims without departing from the spirit and intended scope of the invention. For example, one of several possible SPIN translator functions could be selected for each account access, either randomly or by user selection. Moreover, a MRS equation may allow a variable number of arguments such as multiple RPINs. Additionally, a list of RPINs generated for an account could be maintained and checked to ensure complete uniqueness of each provided RPIN by precluding provision of a previously used RPIN (or use of a recently used RPIN if the list is bounded).

What is claimed is:

1. An account access system controlling access to an identified account in a database and comprised of:
    a database interface coupled to the database for receiving a master personal identification number associated with the identified account;
    a random personal identification number generator;
    a user interface coupled to said random number generator to receive a random personal identification number that is communicated to a user; and
    a validator coupled to said user interface to receive a secured personal identification number generated by said user using a translation function known to said user prior to receiving said master personal identification number associated with the identified account to translate said random personal identification number and condition access to said identified account upon validation of said secured personal identification number with reference to said random personal identification number.

2. The account access system of claim 1 further comprising:
    a translator coupled to said random number generator to receive said random personal identification number and to said database interface to receive said master personal identification number associated with said account whereby said translator generates a secured personal identification number from said random personal identification number and said master personal identification number.

3. The account access system of claim 2 wherein said validator is coupled to said translator to receive said generated secured personal identification number and whereby validation of said user secured personal identification number is conditioned upon identity of said generated secured personal identification number and said user secured personal identification number.

4. A method for verifying access rights comprised of the following steps:
    identifying a master personal identification number;
    generating a random personal identification number;
    communicating said random personal identification number to a user;
    receiving a first secured personal identification number generated by said user using a translation function, known to said user prior to receiving said master personal identification number associated with the identified account to translate said random personal identification number;
    generating a second secured personal identification number from said master personal identification number and said random personal identification number; and
    validating said first secured personal identification number with reference to said second personal identification number.

5. The method for verifying access rights of claim 4 wherein said step of validating said first secured personal identification number comprises verifying equality of said first secured personal identification and said second secured personal identification number.

6. A customer account access system comprised of:
    an announcer;
    a user input device;
    a database interface coupled to a database of customer accounts to retrieve information associated with said customer accounts;
    a random personal identification number generator coupled to said announcer;
    a secured personal identification number translator coupled to said random number generator and said database interface, wherein said secured personal identification number translator receives a secured personal identification number generated by a user using a translation function known to said user prior to receiving said information associated with said customer accounts to translate said random personal identification number; and
    a secured personal identification number validator coupled to said user input device and said secured personal identification number translator.

7. The customer account access system of claim 6 wherein said information associated with said customer accounts includes a master personal identification number and said secured personal identification number translator generates a secured personal identification number from said master personal identification number and a random personal identification number.

8. The customer account access system of claim 7 wherein said secured personal identification number translator is random PIN-unique.

9. The customer account access system of claim 7 wherein said secured personal identification number translator is secured PIN-unique.

10. The customer account access system of claim 7 wherein said secured personal identification number translator is completely unique.

11. The customer account access system of claim 7 wherein said secured personal identification number translator is digital.

12. The customer account access system of claim 7 wherein said secured personal identification number validator compares a secured personal identification number received at the user interface with a secured personal identification number generated by said secured personal identification number translator.

13. A method of controlling customer account access comprised of the steps of:
    receiving a customer account identifier;
    retrieving a master personal identification number associated with said customer account identifier;
    generating a random personal identification number;
    announcing said random personal identification number;
    receiving a first secured personal identification number generated by a user using a translation function, known to said user prior to receiving said master personal identification number associated with the identified account to translate said random personal identification number;
    generating a second secured personal identification number; and
    conditioning access to the customer account upon validation of said first secured personal identification number with reference to said second secured personal identification number.

14. The method of controlling customer account access of claim 13 wherein said step of generating a second secured personal identification number comprises translation of a secured personal identification number from said master personal identification number and said random personal identification number.

15. The method of controlling customer account access of claim 14 wherein said step of generating a second secured personal identification number is random PIN-unique.

16. The method of controlling customer account access of claim 14 wherein said step of generating a second secured personal identification number is secured PIN-unique.

17. The method of controlling customer account access of claim 14 wherein said step of generating a second secured personal identification number is completely unique.

18. The method of controlling customer account access of claim 14 wherein said step of generating a second secured personal identification number is digital.

19. The method of controlling customer account access of claim 13 further comprising selectively receiving said master personal identification number and conditioning access to the customer account upon validation of said master personal identification number.

20. The method of controlling customer account access of claim 13 further comprising generating a second random personal identification number if said random personal identification number has been generated for a previous customer account access attempt.

21. The method of controlling customer account access of claim 13 further comprising generating a second random personal identification number if said random personal identification number has been generated for a recent customer account access attempt.

* * * * *